US010781938B2

(12) United States Patent
Ohnmacht et al.

(10) Patent No.: US 10,781,938 B2
(45) Date of Patent: Sep. 22, 2020

(54) VALVE FOR OPENING AND CLOSING A LINE SYSTEM

(71) Applicant: Kendrion (Villingen) GmbH, Villingen-Schwenningen (DE)

(72) Inventors: Martin Ohnmacht, Fluorn-Winzeln (DE); Wolfram Maiwald, Obereschach (DE); Wolfgang Burk, Villingen-Schwenningen (DE); Stefan Barth, Donaueschingen (DE)

(73) Assignee: Kendrion (Villingen) GmbH, Villingen-Schwenninge (DE)

( * ) Notice: Subject to any disclaimer, the term of this patent is extended or adjusted under 35 U.S.C. 154(b) by 0 days.

(21) Appl. No.: 16/313,769

(22) PCT Filed: Jun. 1, 2017

(86) PCT No.: PCT/EP2017/063336
§ 371 (c)(1),
(2) Date: Dec. 27, 2018

(87) PCT Pub. No.: WO2018/001677
PCT Pub. Date: Jan. 4, 2018

(65) Prior Publication Data

US 2019/0170270 A1 Jun. 6, 2019

(30) Foreign Application Priority Data

Jun. 29, 2016 (DE) ........................ 10 2016 111 937

(51) Int. Cl.
*F16K 31/124* (2006.01)
*F16K 31/383* (2006.01)

(52) U.S. Cl.
CPC ....... *F16K 31/383* (2013.01); *Y10T 137/7761* (2015.04); *Y10T 137/7764* (2015.04);
(Continued)

(58) Field of Classification Search
CPC ............. F16K 31/383; Y10T 137/7761; Y10T 137/7765; Y10T 137/7766; Y10T 137/7764; Y10T 137/7771
(Continued)

(56) References Cited

U.S. PATENT DOCUMENTS 1,994,320 A 3/1935 McLaughlin
2,333,415 A * 11/1943 Du Bois ................ F16K 24/00 137/493.1
(Continued)

FOREIGN PATENT DOCUMENTS

CN 1189209 7/1998
CN 102102777 6/2011
(Continued)

OTHER PUBLICATIONS

German Patent Office, "Office Action" issued in German Patent Application No. 102016111937.7, dated Jun. 21, 2017, document of 10 pages.
(Continued)

*Primary Examiner* — Minh Q Le
(74) *Attorney, Agent, or Firm* — Akerman LLP; Peter A. Chiabotti

(57) ABSTRACT

The application relates to a valve for a line system, comprising a valve body which forms a valve seat, a line system with a supply line for supplying a fluid to the valve seat and with a discharge line for discharging the fluid from the valve seat, which fluid is under a supply pressure in the supply line and under a working pressure in the discharge line, a closing element which interacts with the valve seat for opening and closing the line system, which closing element releases a throttle cross section between the valve seat and the closing element, a restoring element which applies a restoring force on the closing element, which restoring force presses the
(Continued)

10
12,14
36,40
30,36
36,42
36,41
32,34
12,16
35
24
26
18,20,pV
L
18,22,pN
28
52,54
44,50
48,50,d2
46,50,pS closing element against the valve seat in order to close the line system, and a pressure chamber in which the fluid is under a closing pressure to close the line system.

11 Claims, 3 Drawing Sheets

(52) U.S. Cl.
CPC .... *Y10T 137/7765* (2015.04); *Y10T 137/7766* (2015.04); *Y10T 137/7771* (2015.04)

(58) Field of Classification Search
USPC ............ 137/490, 487.5, 469, 491, 489, 493; 251/129.15, 129.18, 282
See application file for complete search history.

(56) References Cited

U.S. PATENT DOCUMENTS 2,426,900 A 9/1947 Parker
2,672,888 A * 3/1954 Shields ................. F16K 31/383 251/36
2,882,922 A * 4/1959 Schindel ............... F16K 17/105 137/491
3,160,332 A * 12/1964 Brunson ................. F16K 17/10 222/318
3,282,289 A * 11/1966 Vick ................... F16K 17/0433 137/375
3,430,646 A * 3/1969 Vick ................... F16K 17/0433 137/375
3,473,780 A 10/1969 Harms
3,626,975 A * 12/1971 Bobst .................. F16K 17/0433 137/484
3,651,827 A * 3/1972 Hammer .............. B01D 35/143 137/469
3,854,494 A 12/1974 Zahorsky
3,860,073 A * 1/1975 Willms ................ A62C 13/003 169/20
3,972,345 A 8/1976 Court
3,987,814 A * 10/1976 Hall ...................... F16K 17/105 137/469
4,351,356 A 9/1982 Koiwai et al.
4,442,864 A 4/1984 Kosugi
4,667,695 A * 5/1987 Gold .................. G05D 16/2093 137/486
4,736,767 A 4/1988 Leighton
5,301,920 A * 4/1994 Ichiki .................. F16K 31/0668 251/30.04
5,730,182 A * 3/1998 Ishizaki .............. F15B 13/0417 137/489
6,062,530 A 5/2000 Hajjar
6,443,420 B1 9/2002 Hettinger
8,627,846 B2 * 1/2014 Grenaway ............ G05D 16/163 137/491
9,851,015 B2 * 12/2017 Neubauer ............. F16K 17/105
2004/0089347 A1 * 5/2004 Cavagna ................. F16K 17/10 137/491
2006/0284130 A1 12/2006 Cripps et al.
2008/0042086 A1 2/2008 Sisk et al.
2009/0178811 A1 7/2009 Sun et al.
2010/0006159 A1 * 1/2010 Lin ....................... F16K 15/063 137/491
2010/0037956 A1 2/2010 Scudamore et al.
2012/0199775 A1 8/2012 Watanabe
2015/0090912 A1 * 4/2015 Buse ................... F16K 31/0658 251/129.07

FOREIGN PATENT DOCUMENTS

| | | |
|---|---|---|
| CN | 103261591 | 8/2013 |
| DE | 10 57 409 | 5/1959 |
| DE | 199 55 083 | 5/2001 |
| EP | 0 872 674 | 10/1998 |
| EP | 2 115 336 | 11/2009 |
| EP | 2 492 559 | 8/2012 |
| JP | S5620877 | 2/1981 |
| JP | H2275185 | 11/1990 |
| JP | 2004-324852 | 11/2004 |
| JP | 2007-40389 | 2/2007 |
| WO | 2014095402 | 6/2014 |

OTHER PUBLICATIONS

World Intellectual Property Organization, "International Search Report" and English translation thereof dated Aug. 16, 2017, document of 6 pages.
European Patent Office, "Office Action" and English translation thereof, issued in European Patent Application 17 729 066.5, dated Oct. 30, 2019, document of 8 pages.
The State Intellectual Propert Office of People's Republic of China, "The First Office Action," and English translation thereof issued in Chinese Patent Application No. 201780040793.1, dated Sep. 3, 2019, document of 18 pages.
Japanese Patent Office, "Notice of Reasons for Refusal" and English translation thereof, issued in Japanese Patent Application No. 2018-562680, dated Oct. 11, 2019, document of 7 pages.

* cited by examiner

VALVE FOR OPENING AND CLOSING A LINE SYSTEM

CROSS REFERENCE TO RELATED APPLICATIONS

This application is a § 371 National Phase of PCT/EP2017/063336, filed Jun. 1, 2017, the entirety of which is incorporated by reference and which claims priority to German Patent Application No. 10 2016 111 937.7, filed Jun. 29, 2016.

BACKGROUND

The present application relates to a valve for opening and closing a line system.

SUMMARY

Valves generally comprise a stationary valve seat with which the line system can be closed and opened in such a manner that a movable closing element cooperates with the valve seat. Such line systems comprise a supply line for supplying a fluid to the valve seat and to a removal line for removing the fluid from the valve seat, wherein the fluid in the supply line stands under a supply pressure and in the removal line under a working pressure. A few applications require that the valve is closed as long as the supply pressure is below a certain threshold value and the valve opens as soon as the supply pressure exceeds the threshold pressure.

This quality can basically be converted with the aid of adjustment devices which then appropriately move the closing element when the threshold value is exceeded or dropped below. For example, electromagnetic valves can be used for this. However, it is necessary here to provide a pressure sensor which communicates with a control device which for its part appropriately actuates the adjustment device. In addition to the costs caused by these components, the cabling expense and the required structural space, such electromagnetic valves have in particular the disadvantage that their functionality depends on a suitable current supply. However, the current supply is not always given, especially in electrically autonomous systems such as vehicles. In addition, current consumption associated with the actuation of the electromagnetic valves has a noticeable negative effect on the fuel consumption of the particular vehicle operated with an internal combustion engine. The range is reduced in electrical vehicles on account of the elevated current consumption.

In order to counteract these disadvantages, fluid-control valves are used. Such valves comprise a restoring element which presses the closing element with a certain restoring force against the valve seat. As long as the supply pressure of the fluid is below the threshold value, the valve remains closed so that it is a so-called "normally closed" valve. The valve is designed in such a manner here that a fluid force is applied on the closing element on account of the supply pressure, which force counteracts the restoring force. If the supply pressure rises above the threshold value, the fluid force exceeds the restoring force as a result of which the closing element moves away from the valve seat and the valve is opened.

In order to make the restoring elements as small as possible and to therefore save structural space, some valves have a pressure chamber which is arranged behind the closing element, viewed from the valve seat. The pressure chamber is filled with the fluid standing under a certain pressure. The pressure brings about a closing force which acts in the same direction as the restoring force of the restoring element, as a result of which the restoring element is supported against the valve seat during the pressing of the closing element. Therefore, the pressure of the fluid in the pressure chamber is also designated as the closing pressure in the following. In many instances, the pressure chamber is fluidically connected to the supply line so that the closing pressure is exactly as great as the supply pressure. As the supply pressure rises, the closing pressure also rises, which has the consequence that the closing element moves away from the valve seat only relatively slowly and consequently the throttle cross section between the valve and the closing element, that is, the cross-sectional surface of the flow to be traversed by the fluid when flowing from the supply line into the removal line increases only relatively slowly with a rising supply pressure. The closing element and the valve seat therefore act as a throttle so that the supply pressure is throttled when flowing through the throttle cross section to the working pressure. The throttling becomes stronger, the smaller the throttle cross section is. As a result of the closing element slowly moving away from the valve seat, the supply pressure is throttled relatively strongly to the working pressure over a relatively large pressure range of the supply pressure, which is disadvantageous in as far as a high working pressure is desired for many applications.

An embodiment of the application is directed to improving the fluid-controlled valve of the initially described manner in such a manner that the supply pressure is less strongly throttled in comparison to known fluid-controlled valves during and after the opening of the valve and consequently a higher working pressure is present. In other words, the opening behavior should be correspondingly improved so that at a given supply pressure in comparison to known fluid-controlled valves, a greater throttle cross section is freed and therefore the pressure drop via the valve is reduced.

An embodiment relates to a valve body consisting of metal or plastic which forms a valve seat, to a line system with a supply line for supplying a fluid to the valve seat and to a removal line for removing the fluid from the valve seat, wherein the fluid in the supply line stands under a supply pressure and in the removal line under a working pressure, to a closing element which cooperates for opening and closing the line system with the valve seat, wherein the closing element frees a throttle cross section between the valve seat and the closing element, to a restoring element which supplies a restoring force onto the closing element which force presses the closing element against the valve seat in order to close the line system, to a pressure chamber in which the fluid stands under a closing pressure with which the fluid applies a closing force onto the closing element for closing the line system, wherein the valve comprises means with which the closing pressure can be lowered in the pressure chamber below the supply pressure as a function of the freed throttle cross section.

As previously mentioned, the fluid-controlled valves known from the prior art open relatively slowly since the closing pressure is just as great as the supply pressure. Since the closing force applied by the closing pressure acts against the force which the fluid applies on the closing element, the fluid must work against the closing pressure. In contrast thereto, the disclosed embodiments make it possible to lower the closing pressure below the supply pressure as a function of the freed throttle cross section. As a consequence thereof, the force necessary to move the closing element away from the valve seat drops. This brings it about that the valve is opened more strongly at a given pressure above the threshold value in comparison to traditional valves. The stronger opening has the effect that the supply pressure is throttled less strongly when it flows through the throttle cross section. Consequently, the working pressure is reduced less strongly, which is especially advantageous in applications in which a high working pressure is required.

Another embodiment can comprise a conduit which runs through the closing element and empties into the supply line, which conduit has a fluid communication with the pressure chamber. Conduits are generally relatively simple to manufacture in order to fluidically connect the pressure chamber in particular to the supply conduit. In addition, fluid-controlled valves known from the prior art already have conduits which can be at least partially used. To this extent, the additional technical manufacturing expense for preparing such an embodiment is comparatively low.

According to a further-developed embodiment the valve comprises a bypass which comprises the conduit running through the closing element and emptying into the supply line and comprises an annular slot surrounding the closing element and emptying into the discharge line. The fluid-controlled valves known from the prior art comprise a bypass which connects the supply line while circumventing the valve seat with the discharge line. The pressure chamber is arranged between the conduit and the annular slot. It is also the case here that the additional expense for making the means available is comparatively low.

Another embodiment comprises an insertion element which forms, together with the closing element, at least a part of the conduit in the area of the throttle cross section. It is possible in this embodiment to readily guide the conduit into the area of the throttle cross section. As a result of the above-described throttling, the static pressure in the throttle cross section is lowered. The insertion element is designed in such a manner that the conduit in the area of the throttle cross section empties into the supply conduit. Therefore, the reduced static pressure is tapped off as in a Venturi tube. Since the pressure chamber is fluidically connected via the conduit to the supply conduit, due to the fact that the conduit in the area of the throttle cross section empties into the supply conduit, not the supply pressure but rather the reduced, static pressure is in the pressure chamber, so that the closing pressure drops. The static pressure becomes lower, the smaller the freed throttle cross section is, which is the case at the start of the opening of the valve. Consequently, at the starting of the opening of the valve, the closing pressure and the closing force resulting from it are especially low, so that the valve opens more rapidly in comparison to known, fluid-controlled valves. It follows from this that at a given supply pressure above the threshold value a working pressure is available which is elevated in comparison to known, fluid-controlled valves. Furthermore, the conduits can be manufactured in a relatively simple manner using the insertion element without additional bores, lines or other construction elements having to be provided.

An embodiment which is developed further is distinguished in that the closing element comprises a cylindrical recess in which the insertion element is arranged. In many instances, closing elements of fluid-controlled valves known from the prior art comprise a cylindrical recess so that there is the opportunity to arrange the insertion element there. On the one hand, based on this arrangement, the conduits can be made available in an especially simple manner and on the other hand no additional structural space is needed to house the insertion element in the valve.

According to another embodiment, the insertion element has a U-shaped cross section with a first shank running substantially vertically to the longitudinal axis and a second shank running substantially parallel to the longitudinal axis. Instead of the U-shaped cross section, the insertion element could also be designed in the shape of a disk. The U-shaped cross section has however, the advantage that the surface on which an elevated flow rate is already present and therefore a reduced static pressure prevails is reduced. This pressure reduction otherwise brings about a force on the insertion element in the closing direction which is not desired. In addition, material can be saved with the U-shaped cross section.

Furthermore, the insertion element can have a first front surface which faces the closing element and on which a number of indentations are arranged. The indentations form a part of the conduit and are flowed through by the fluid. The indentations make it possible to directly connect the insertion element to the closing element without having to provide fastening projections or spacers. This simplifies the manner of how the insertion element is fastened on the closing element.

There is the possibility that the insertion element on the free end of the second shank forms a second front surface which has a bevel facing the longitudinal axis. The providing of a bevel on the free end of the second shank has the result that the insertion element runs in a relatively pointed manner in the area of the throttle cross section. This brings about a second throttling and consequently a preliminary throttling, as a result of which the closing pressure in the pressure chamber is lowered in an especially sharp manner and the opening behavior of the valve can be further improved. It is mentioned at this point that a strong throttling also brings about a strong lowering of the working pressure which, at the first glance, opposes the goal of the present application. However, the throttling decreases as the distance of the closing element from the valve seat increases. Consequently, the lowering of the working pressure lasts only a relatively short time and is compensated again with an increasing distance of the closing element from the valve seat and is overcompensated after a certain distance.

An embodiment which is further developed is characterized in that the insertion element can be moved relative to the closing element. As a result thereof, the throttle cross section can be changed as a function of the existing supply pressure so that an especially good throttling can be made available immediately after the opening of the valve. As previously mentioned, an especially effective throttling brings about a sharp lowering of the closing pressure in the pressure chamber. The stronger the closing pressure can be lowered in the pressure chamber, the better the opening behavior is. This can be achieved in that the distance between the front surface of the insertion element and the closing surface of the closing element is reduced in the open state. In this manner the cross section of the overflow of the preliminary throttling is reduced, which raises the speed and reduces the static pressure, which for its part lowers the restoring force generated by the pressure chamber. The appropriate maximum is located here approximately at the point at which the preliminary throttling becomes the main throttle (distance front surface—closing surface approximately 0 mm).

Another embodiment is distinguished in that the insertion element is fastened by a number of springs on the closing element. The use of springs makes it possible to define in a simple manner the movement of the insertion element relative to the closing element, for example, in that springs with a certain characteristic curve are used. It can be determined with the selection of the characteristic curve how far the insertion element shifts relative to the closing element at a certain supply pressure.

In an embodiment which is further developed, the valve has an adjusting device for moving the closing element along the longitudinal axis. As has already been mentioned several times, the present application relates to a fluid-controlled valve which does not require a separate adjusting device. However, a plurality of fluid-controlled valves known from the prior art comprises an adjusting device which is known from electromagnetic valves and comprises an armature, a pole core and a coil form. This adjusting device can be used as a redundancy in order to be sure that that the fluid-controlled valve can be closed under all conditions. This increases the operational safety of the present valve.

In another embodiment the restoring element is designed as a permanent magnet. A significant feature of the permanent magnet is that the force exerted by it can be controlled by the magnitude of a slot filled with a magnetically non-relevant fluid such as air or oil, frequently also designated as an air gap, for example, the width of an annular slot which the magnetic field lines emanating from the permanent magnet must cross. This quality can be used to adjust certain characteristics in particular in order to make a good opening behavior available. To this end, a relatively large opening pressure at the start of the opening process can be desirable whereas later a throttling should be avoided as far as possible in order to lower the working pressure as little as possible. Given an appropriate arrangement of the slot which must be crossed by the magnetic field lines and whose size changes in a corresponding manner during the opening process, the restoring force exerted by the permanent magnet on the closing element can be changed in such a manner that the desired opening behavior can be adjusted.

An embodiment relates to a vehicle which comprises a valve according to one of the previous claims. The technical effects and advantages which can be achieved with the suggested vehicle correspond to those which were discussed for the suggested valve. In sum, it is pointed out that it is possible with the present valve to make a good opening behavior available so that the working pressure is higher at a certain supply pressure located above the threshold value in comparison to known, fluid-controlled valves. A higher working pressure can be advantageously used, for example, under the following conditions: in vehicles, the motor oil can be used to cool the piston head of an internal combustion engine. However, a cooling of the piston head is only necessary when the internal combustion engine is being operated above a certain suction load. For example, after a start, in particular after a cold start and during a standstill of the vehicle, a cooling of the piston head is generally not necessary.

An opening of the present valve can be used to utilize the working pressure for loading jet with which motor oil is sprayed against the piston head, which is consequently cooled.

A realization of the present application relates to a method for operating a valve for opening and closing a line system, wherein the valve comprises

- a valve body consisting of metal or plastic which forms a valve seat,
- a line system with a supply line for supplying a fluid to the valve seat and with a discharge line for discharging the fluid from the valve seat, wherein the fluid in the supply line stands under a supply pressure and in the discharge line under a working pressure,
- a closing element which cooperates with the valve seat for opening and closing the line system,
- A restoring element which applies a restoring force on the closing element and which presses the closing element against the valve seat (26) for closing the line system, and
- A pressure chamber in which the fluid stands under a closing pressure with which the fluid applies a closing force on the closing element for closing the line system, wherein the method comprises the following steps:
- Releasing a throttle cross section between the valve seat and the closing element when the supply pressure exceeds a settable threshold value, and
- Lowering the closing pressure in the pressure chamber below the supply pressure with appropriately designed means.

The technical effects and advantages which can be achieved with the suggested method correspond to those which were discussed for the suggested valve. In sum, it is pointed out that it is possible with the present valve to make a good opening behavior available so that the working pressure is greater at a certain supply pressure located above the threshold value in comparison to known fluid-controlled valves.

An embodiment relates to the using of a valve according to one of the previously explained embodiments for applications in the automotive area and in particular for cooling piston heads. The technical effects and advantages which can be achieved with the suggested usage correspond to those which were discussed for the suggested valve. In sum, it is pointed out that it is possible with the present valve to make a good opening behavior available so that the working pressure is greater at a certain supply pressure located above the threshold value in comparison to known fluid-controlled valves.

BRIEF DESCRIPTION OF THE DRAWINGS

Exemplary embodiments are discussed in detail in the following with reference made to the attached drawings. In the drawings FIG. 1 Shows a sectional view through an exemplary embodiment of the fluid-controlled valve in the closed state, FIG. 2 Shows the valve shown in FIG. 1 in the open state, FIG. 3*a*) Shows an enlarged view of the area X characterized in FIG. 1, FIG. 3*b*) shows an enlarged view of the area Z characterized in FIG. 3*a*), FIG. 3*c*) Shows an enlarged view similar to FIG. 3*b*) wherein, however, the valve is in the open state according to FIG. 2, FIG. 4 Shows a perspective view of an insertion element, FIG. 5 Shows an enlarged view of the area Y characterized in FIG. 1, and FIG. 6 Shows a perspective view of a part of another exemplary embodiment of the fluid controlled valve.

DETAILED DESCRIPTION

Figure 1:
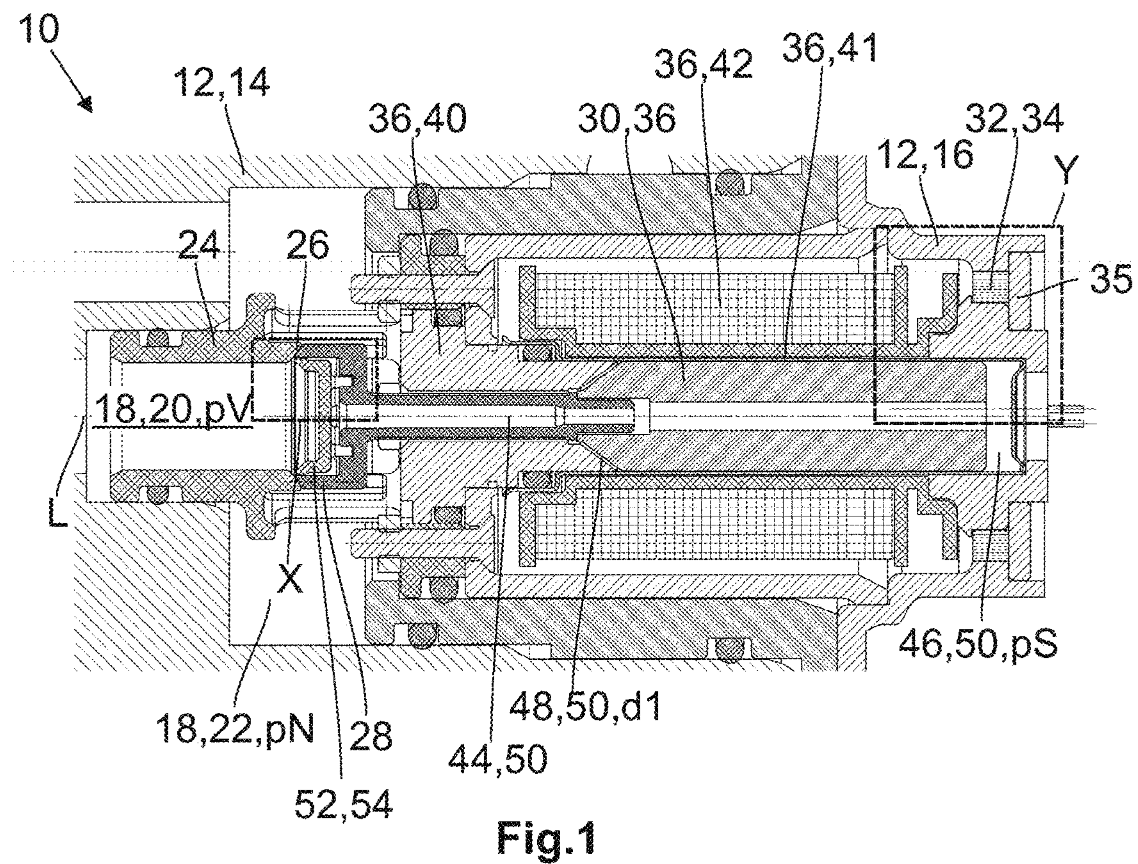

FIG. 1 shows an exemplary embodiment of the fluid-controlled valve 10 using a sectional view. The valve 10 comprises a housing 12 with a first housing part 14 and a second housing part 16, wherein a line system 18 is arranged in the first housing part 14, which comprises a supply line 20 and a discharge line 22. Furthermore, a valve body 24 is arranged in the first housing part 14 which body forms a valve seat 26. The valve body 24 can be manufactured, for example, from metal or plastic. Furthermore, the valve 10 comprises a closing element 28 which is arranged so that it can shift along a longitudinal axis L. The closing element 28 is connected to an armature 30 which cooperates with a restoring element 32, in this case with a radially magnetized permanent magnet 34. The permanent magnet 34 is arranged in an appropriately shaped receptacle of the second housing part 16 and is fixed in the receptacle by a sheet 35 which is not magnetically relevant. The sheet 35 can be manufactured, for example, from high-grade steel.

The armature 30 is part of an adjusting device 36 with which the closing element 28 can be shifted along the longitudinal axis L. The adjusting device 36 furthermore comprises a pole core 40 which surrounds the closing element 28 and comprises a casing 41 which surrounds the armature 30. A coil body 42 also belonging to the adjusting device 36 is arranged radially outside the casing 41 and can be loaded in a manner not shown in detail with electrical current, as a result of which the closing element 28 can be shifted along the longitudinal axis L. However, it should already be noted at this point that the adjusting device 36 is provided mainly for closing the valve even above the opening pressure, and the closing element 28 is exclusively shifted by a fluid in non-actuated operation which fluid flows from the supply line 20 into the discharge line 22 when the valve 10 is open.

Figure 2:
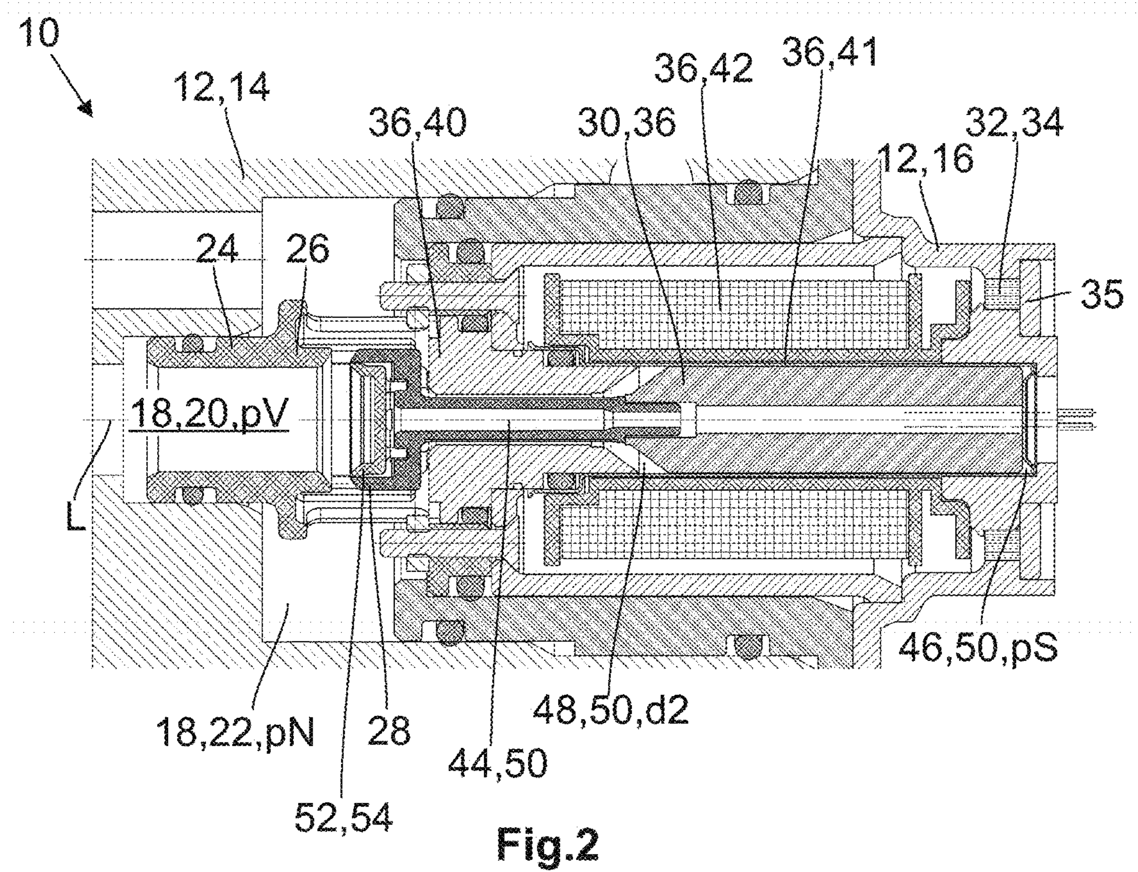
Figure 5:
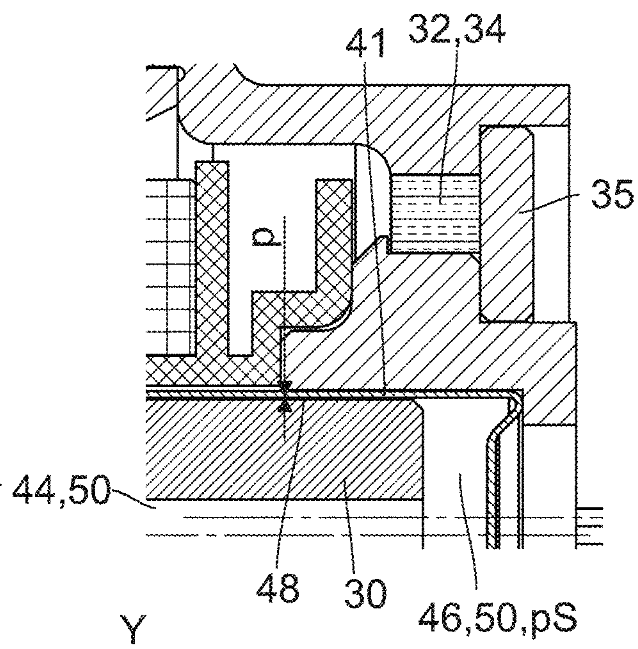

The closing element 28 comprises a conduit 44 which runs through the middle of the closing element 28 and which continues inside the armature 30 along the longitudinal axis L. The conduit 44 empties at the back end of the anchor, viewed from the closing element 28, into a pressure chamber 46. An annular slot 48 is formed between the casing 41 and the armature 30 as well as between the closing element 28 and the pole core 40. The annular slot 48 has an interval p between the armature 30 and the casing 41 (see FIG. 5) which is between 0.03 and 0.07 mm in the example shown, as a result of which a cross-sectional surface of between 0.72 to 1.68 $mm^2$ is achieved. Furthermore, the annular slot 48 between the armature 30 and the pole core 40 has a distance d which varies according to the position of the armature 30 between the values d1 and d2. In the closed state shown in FIG. 1 the distance d1 is distinctly smaller than the distance d2 in the open state of the valve 10 shown in FIG. 2.

The conduit 44, the pressure chamber 46 and the annular slot 48 form a bypass 50 with which the supply line 20 in the discharge line 22 are connected with circumvention of the closing element 28. The annular slot 48 is conditioned by the construction, especially between the casing 41 and the armature 30, and is not necessary for realizing the principles described herein. To this extend, it is not necessary to provide a bypass 50. Only the fluid communication between the supply line 20 and the pressure chamber 46 must be given.

The fluid flowing into the supply line 20 stands under a supply pressure pV. The fluid in the discharge line 22 stands under a working pressure pN and the fluid in the pressure chamber 46 stands under a closing pressure pS.

Furthermore, the present valve 10 comprises means with which the closing pressure pS in the pressure chamber 46 can be lowered below the supply pressure pV, as will be explained in detail in the following. In the example shown, the means 52 comprises an insertion element 54 which is shown on an enlarged scale in FIG. 3*a*). The closing element 28 has a U-shaped section on its free end which cooperates with the valve seat 26 for closing the valve 10. Inside the U-shaped recess the closing element 28 forms a cylindrical recess 56 in which the insertion element 54 is arranged. The insertion element 54 is fastened in the example shown by a spring 58 on the closing element 28 so that it can move along the longitudinal axis L. Alternatively, the insertion element 54 can also be directly fastened firmly on the closing element 28 without using springs 58.

Figure 4:
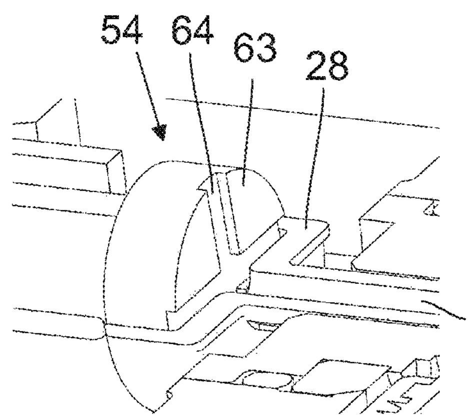

The insertion element 54 also has a U-shaped cross section for which it comprises a first shank 60 running approximately vertically to the longitudinal axis L and comprises a second shank 62 running substantially parallel to the longitudinal axis L. FIG. 4 shows that the insertion element 54 has a total of four recesses 64 running in a crossed manner on a first front surface 63 which faces the closing element 28.

On a second front surface 65 arranged on the free end of the second shank 62 the insertion element 54 has a bevel 66 which faces the longitudinal axis L (see in particular FIGS. 3*a*) to 3*c*).

The insertion element 54 is fastened on the closing element 28 in such a manner that a slot 68 running parallel to the longitudinal axis L is formed between the second shank 62 and the closing element 28. The distance q between the closing element 28 and the insertion element 54 which forms the slot 68 is between 0.07 and 0.13 mm, so that a cross-sectional surface of 1.78 and 3.31 $mm^2$ is made available. The indentations 64 establish the fluid communication between the slot 68 and the conduit 44, which is especially apparent from FIG. 4.

The present valve 10 is operated in the following manner: In the starting state the supply pressure pV of the fluid in the supply conduit is below a certain threshold value which can be, for example, between 0.8 and 1 bar.

Due to the fact that the pressure chamber 46 has a fluid communication with the supply line 20 via the slot 68 made available by the insertion element 54 and via the conduit 44, the closing pressure pS in the pressure chamber 46 is exactly as great as the supply pressure pV.

In this case, the sum of the restoring force applied by the restoring element 32 and of the closing force applied by the closing pressure pS is greater than the force acting by the fluid as a result of the supply pressure on the closing element 28. Consequently, the closing element 28 is pressed against the valve seat 26, as a result of which the valve 10 is closed. The working pressure pN prevailing in the discharge conduit is 0 bars.

If the supply pressure pV now rises above the threshold value, the closing element 28 begins to move away from the valve seat 26. This movement results from a comparison of the FIGS. 3*b*) and 3*c*). Consequently, a throttle cross section A is freed which can be flowed through by the fluid. At the beginning of this movement of the closing element 28 away from the valve seat 26 the throttle cross section A is very small so that the closing element 28 and the valve seat 26 together have the effect of a throttle. The permanent magnet 34 supports the movement of the closing element 28 in that its restoring force falls on the armature 30 and consequently the closing element 28 with an increasing width d1 of the annular slot 48 and therefore makes possible a greater opening movement at the same supply pressure pV. This brings about a sinking pressure drop via the valve and the working pressure pN rises. The throttling, which is reduced but nevertheless present, produces a reduction of the static pressure in the annular slot 48 defined by valve seat 26 and closing element 28.

Figure 3A:
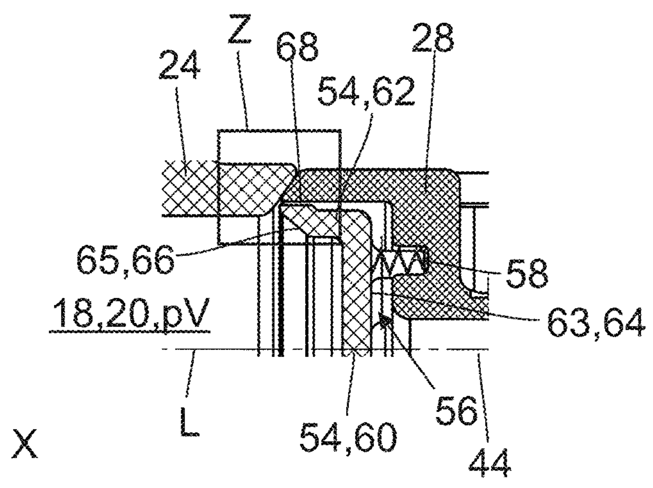
Figure 3B:
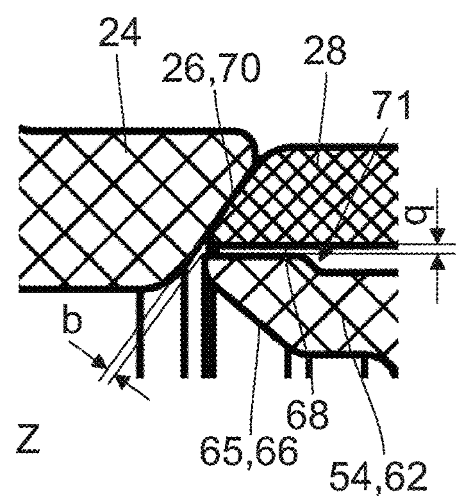

As is particularly apparent from the FIGS. 3*b*) and 3*c*), the slot 68 empties in the area of the throttle cross section A into the supply line 20. This brings it about that the reduced backup pressure is transferred via the slot 68 and via the conduit 44 into the pressure chamber 46 so that the closing pressure pS drops. This has for its part the consequence that the closing force applied by the pressure chamber 46 on the closing element 28 also drops and at a given supply pressure pV the closing element 28 can be shifted further against the restoring element 32 away from the valve seat 26 than is the case with known valves. Known valves do not comprise the means 52 and in particular the insertion element 54, so that the supply pressure pV is also present in the pressure chamber 46 and cannot be lowered. In the valve 10 the throttle cross section A is greater at a given supply pressure pV, as a result of which the throttling of the supply pressure pV on the working pressure pN during the flowthrough of the throttle cross section a is less. This effect is strengthened even more by the using of the permanent magnet 34 since the restoring force applied by the permanent magnet 34 on the armature 30 and therefore on the closing element 28 decreases with an increasing interval d of the annular slot 50. As a result, at a given supply pressure pV there is a higher working pressure pN than there is in known valves.

Figure 3C:
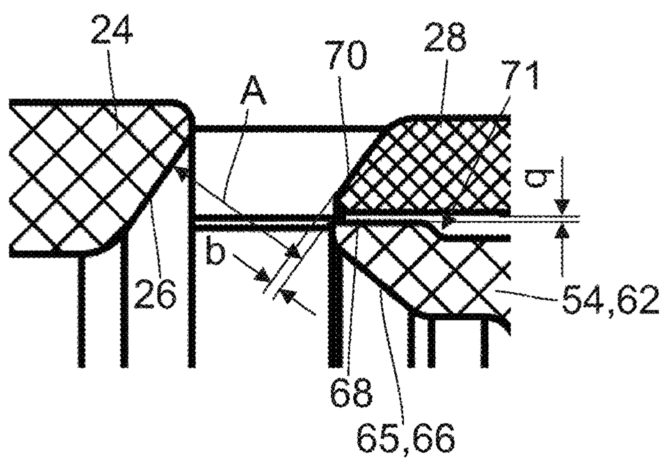

As was already explained, the insertion element 54 is fastened to the closing element 28 by the springs 58 (cf. FIG. 3*a*). The characteristic curves of the springs 58 are selected in such a manner that in the closed state of the valve 10, that is, when the closing element 28 rests with a closing surface 70 (see FIG. 3*c*) on valve seat 26, an interval b which describes the lowest interval between the insertion element 54 and the closing surface 70 is not dropped below. In the example shown, the interval b is between 0.09 and 0.11 mm. This ensures a pressure compensation between the supply conduit 20 and the pressure chamber 46. The same applies in an analogous manner if the insertion element 54 is firmly fastened to the closing element 28.

As described above, in order to realize a good opening behavior, a relatively strong throttling at the beginning of the opening procedure is important in order to effectively lower the closing pressure pS in the pressure chamber 44, whereas later, a throttling should be avoided to the extent possible in order to lower the working pressure pN as little as possible. For the given case that the insertion element 54 can move relative to the closing element 28, the insertion element 54 is shifted with an increasing supply pressure pV along the longitudinal axis L toward the closing element 28 and the springs 58 are compressed. The interval b is consequently enlarged, so that the throttle effect emanating from the insertion element 54 continues decreasing and after a certain point becomes negligibly low. This has the consequence that the working pressure pN is constantly throttled less strongly as the supply pressure pV rises. In other words, when the stroke of the valve 10 remains the same, the pressure drop is reduced. In addition, the interval (FIG. 3*c*)) can be reduced after the opening. This reduces the cross section of the overflow of the preliminary throttling, as a result of which the speed is increased and the static pressure is reduced, which for its part lowers the restoring force generated by the pressure chamber. The appropriate maximum here is approximately at the point at which the preliminary throttling becomes the main throttle (b approximately 0 mm) This improves the opening behavior and the stroke is increased at a given supply pressure.

As is especially evident from the FIGS. 3*b*) and 3*c*), the insertion element 54 comprises an offset 71 on its second shank 62. The offset 71 brings it about that the interval q of the slot 68 is present only over a part of the second shank 62 and the slot 68 widens out after it. Due to the interval q shortened as a consequence compared to a design without an offset, the pressure loss is reduced, in particular given an unfavorable tolerance position. The above-described, desired opening behavior is supported by this. Moreover, the force of the valve 10 for retaining the tightness in the closed state is stabilized at different tolerance positions.

The closing surface 70 of the closing element 28 follows the course of the surface of a spherical segment and is therefore convexly curved. On the other hand, the valve seat 26 is largely plane. This produces a linear contacting and no surface contacting when valve 10 is closed. The production of a linear contacting has the advantage over a surface contacting that a more secure closure of the valve 10 is ensured even when using less strict tolerances.

Figure 6:
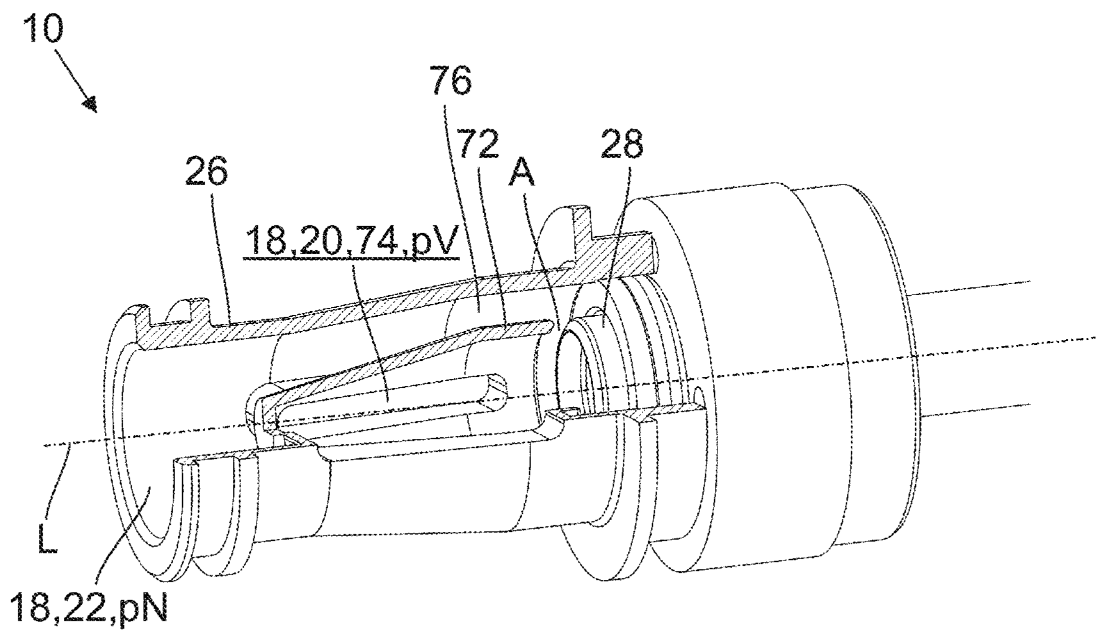

FIG. 6 shows another exemplary embodiment of the fluid-controlled valve 10 using a perspective partial view, wherein the insertion element 54 is not shown for reasons of presentation. The construction of the closing element 28 and of the insertion element 54 and their arrangement relative to one another are the same as in the exemplary embodiments shown in the FIGS. 1 to 5. However, in this instance the flowthrough through the valve 10 is in the opposite direction. Whereas in the exemplary embodiment shown in the FIGS. 1 to 5 the supply line 20 exits concentrically to the longitudinal axis L and the discharge line 22 exits radially out of the first housing part 14, this is reversed in the other exemplary embodiment. The supply line 20 enters radially into the first housing part 14 and the discharge line 22 runs concentrically to the longitudinal axis L. In order to be able to achieve the above-described effects, it is not sufficient to simply reverse the direction of flow of the fluid but rather the insertion element 54 and the closing element 28 must be flowed against in the same manner. To this end, the valve seat 26 is modified in such a manner that the supply line 20 comprises a substantially cylindrical section 72 which is arranged inside the discharge line 22 and communicates via a slot 74 with the remaining supply line 20. In the example shown, the substantially cylindrical section 72 tapers with an increasing interval from the closing element 28. The fluid flows radially into the first housing part 12 and flows through the slot 74 in order to subsequently flow substantially parallel to the longitudinal axis L to the closing element 28 and to the insertion element 54. After the fluid has passed the throttle cross section A, it flows into the discharge line 22 and substantially parallel to the longitudinal axis L through an annular chamber 76 formed by the cylindrical section 72 inside the discharge line 22 and leaves the first housing part 14 also substantially parallel to the longitudinal axis L. Even in this exemplary embodiment the opening behaviour is improved and the working pressure pN is less strongly throttled than in traditional, fluid-controlled valves.

LIST OF REFERENCE NUMERALS

10 valve
12 housing
14 first housing part
16 second housing part
18 line system
20 supply line
22 discharge line
24 valve body
26 valve seat
28 closing element
30 armature
32 restoring element
34 permanent magnet

35 sheet
36 adjusting device
40 pole core
41 casing
42 coil body
44 conduit
46 pressure chamber
48 annular slot
50 bypass
52 means
54 insertion element
56 recess
58 spring
60 first shank
62 second shank
63 first front surface
64 indentation
65 second front surface
66 bevel
68 slot
70 closing surface
71 offset
72 cylindrical section
74 slot
76 annular chamber
A throttle cross section
b interval front surface—closing surface
d interval
pV supply pressure
pN working pressure
pS closing pressure
L longitudinal axis
P interval armature—casing
q interval closing element—insertion element

The invention claimed is:

1. A valve, comprising:

a valve body with a longitudinal axis and that forms a valve seat;

a line system with a supply line for supplying a fluid to the valve seat and a discharge line for removing the fluid from the valve seat, wherein the fluid in the supply line stands under a supply pressure (pV) and in the discharge line under a working pressure (pN);

a closing element which cooperates with the valve seat for opening and closing the line system, wherein the closing element frees a throttle cross section between the valve seat and the closing element;

a restoring element which supplies a restoring force onto the closing element wherein the restoring force presses the closing element against the valve seat to close the line system;

a pressure chamber in which the fluid stands under a closing pressure with which the fluid applies a closing force onto the closing element for closing the line system;

wherein the valve comprises a conduit via which the closing pressure (pS) can be lowered in the pressure chamber below the supply pressure (pV) as a function of the freed throttle cross section;

wherein the conduit runs through the closing element and empties into the supply line, and wherein the conduit has a fluid communication with the pressure chamber;

a bypass which comprises the conduit and an annular slot surrounding the closing element and emptying into the discharge line; and an insertion element which forms, together with the closing element, at least a part of the conduit in an area of the throttle cross section.

2. The valve according to claim 1, wherein the closing element comprises a cylindrical recess in which the insertion element is arranged.

3. The valve according to claim 2, wherein the insertion element has a U-shaped cross section with a first shank running substantially vertically to the longitudinal axis and a second shank running substantially parallel to the longitudinal axis.

4. The valve according to claim 3, wherein the insertion element has a first front surface which faces the closing element and on which a number of indentations are arranged.

5. The valve according to claim 3, wherein the insertion element on the free end of the second shank forms a second front surface which has a bevel facing the longitudinal axis.

6. The valve according to claim 5, wherein the insertion element can be moved relative to the closing element.

7. The valve according to claim 6, wherein the insertion element is fastened by a number of springs on the closing element.

8. The valve according to claim 1, further comprising an adjusting device for moving the closing element along the longitudinal axis.

9. The valve according to claim 1, wherein the restoring element is designed as a permanent magnet.

10. A vehicle comprising a valve according to claim 1.

11. A method for operating a valve comprising:

providing a valve comprising:

a valve body with a longitudinal axis and that forms a valve seat;

a line system with a supply line for supplying a fluid to the valve seat and a discharge line for removing the fluid from the valve seat, wherein the fluid in the supply line stands under a supply pressure and in the discharge line under a working pressure;

a closing element which cooperates with the valve seat for opening and closing the line system, wherein the closing element frees a throttle cross section between the valve seat and the closing element;

a restoring element which supplies a restoring force onto the closing element, wherein the restoring force presses the closing element against the valve seat to close the line system;

a pressure chamber in which the fluid stands under a closing pressure with which the fluid applies a closing force onto the closing element for closing the line system; and wherein the valve comprises a conduit via which the closing pressure can be lowered in the pressure chamber below the supply pressure as a function of the freed throttle cross section;

wherein the conduit runs through the closing element and empties into the supply line, and wherein the conduit has a fluid communication with the pressure chamber;

a bypass which comprises the conduit and an annular slot surrounding the closing element and emptying into the discharge line;

an insertion element which forms, together with the closing element, at least a part of the conduit in an area of the throttle cross section; and freeing a throttle cross section between the valve seat and the closing element when the supply pressure (pV) exceeds a settable threshold value, and lowering the closing pressure (pS) in the pressure chamber below the supply pressure (pV) via the conduit.

* * * * *

UNITED STATES PATENT AND TRADEMARK OFFICE

CERTIFICATE OF CORRECTION

PATENT NO. : 10,781,938 B2
APPLICATION NO. : 16/313769
DATED : September 22, 2020
INVENTOR(S) : Martin Ohnmacht et al.

It is certified that error appears in the above-identified patent and that said Letters Patent is hereby corrected as shown below:

On the Title Page

The inventor as currently stated, Item (72) is:
Wolfgang Burk

Please correct the inventor name to read as follows:
Wolfgang Bürk

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*